United States Patent [19]

Bonnes et al.

[11] 4,216,802
[45] Aug. 12, 1980

[54] COMPOSITE TUBING PRODUCT

[75] Inventors: Eugene D. Bonnes, 7855 Skylineview Dr., Mentor, Ohio 44060; Vijayraj M. Kotian, 4633 Tudor La.; Paul C. MenMuir, 4619 Friar Rd., both of Stow, Ohio 44224

[73] Assignee: Eaton Corporation, Cleveland, Ohio

[21] Appl. No.: 952,394

[22] Filed: Oct. 18, 1978

[51] Int. Cl.$^3$ ............................................. F16L 9/14
[52] U.S. Cl. ................................ 138/143; 138/145; 138/DIG. 1; 156/327; 156/334
[58] Field of Search .............. 138/139, 140, 141, 143, 138/145, 146, DIG. 1, DIG. 6; 174/107, 47, 110 N; 428/36, 458, 474; 156/326, 327, 334

[56] References Cited

U.S. PATENT DOCUMENTS

| | | | |
|---|---|---|---|
| 2,520,046 | 8/1950 | Merrell | 138/143 |
| 2,581,920 | 1/1952 | Kuhn | 138/DIG. 1 |
| 2,992,939 | 7/1961 | Larson et al. | 138/DIG. 1 |
| 3,502,492 | 3/1970 | Spiller | 138/146 |
| 3,616,364 | 10/1971 | D'Alelieo | 156/327 X |
| 3,812,003 | 5/1974 | Larson et al. | 156/327 X |
| 3,819,473 | 6/1974 | Russell et al. | 138/146 X |
| 3,852,518 | 12/1974 | Wargotz | 174/110 PM X |
| 4,018,733 | 4/1977 | Lopez et al. | 156/327 X |
| 4,130,139 | 12/1978 | Haren | 138/DIG. 1 |

*Primary Examiner*—Richard E. Aegerter
*Assistant Examiner*—James E. Bryant, III

*Attorney, Agent, or Firm*—R. J. McCloskey; A. Chrow

[57] ABSTRACT

An improved elongate deformable tube for use in the conveyance of fluids and/or fluid transmission signals under pressure having a bore therethrough enclosed by a composite annular wall comprising a seamless, as welded, or welded and drawn inner tubular shaped layer made from a metallic material and an outer tubular shaped layer made from a polymeric material. The walls of both the inner and outer layers are substantially uniform in radial thickness around their circumferences with the radial wall thickness of the outer polymeric layer being 50% or more than the total radial thickness of the composite wall of the tube. The outer layer is preferably formed about the inner layer by means of an extrusion process. The inner and outer layers are bonded together by means of a polyamide based hot melt adhesive interposed therebetween which preferably contains an amount by weight of piperazine used in the process of making the polyamide which is less than about 15% by weight to the total weight of the polyamide and that is sufficient to enhance the bond between the layers without adversely affecting its resistance to water degradation. The outer diameter of the outer layer is sized, during the process of making the tube, such that the tube can be attached, without further dimensional alteration, to fittings standardly used to couple equivalently dimensioned tubes having a singular polymeric or metallic wall.

12 Claims, 2 Drawing Figures

COMPOSITE TUBING PRODUCT

This invention relates generally to an improved deformable tube for use in the conveyance of fluids and/or fluid transmission signals under pressure and more particularly to a deformable tube suitable for such use having a composite wall comprising an inner seamless, as welded, or welded and drawn metallic layer and an outer polymeric layer disposed about the inner layer and bonded thereto by means of a polyamide based hot melt adhesive with the walls of both the inner and the outer layer being substantially uniform in radial thickness around their circumferences and the outer diameter having been sized, during the process of making the tube, such that the tube can be attached, without further dimensional alteration, to conventional fittings, standardly used to couple tubing having an equivalently dimensioned singular wall of polymeric or metallic material.

BACKGROUND OF THE INVENTION

This invention represents an improvement over U.S. patent application Ser. No. 890,490 filed in the U.S. Patent and Trademark Office on Mar. 27, 1978 and owned by the assignee of the present invention.

Tubing heretofore used in the conveyance of fluids and/or fluid transmission signals under pressure has in the main been of the type wherein the wall of the tube is made singularly from either a polymeric or a metallic material and the outer diameter of the tube has been sized such that, dependent upon whether the tube is made singularly from a metallic or polymeric material, it can be attached to conventional fittings generally peculiar to each. To a lesser extent, tubes having an extremely thin inner metallic layer formed by longitudinally folding metallic tapes into a tubular shape and extruding a polymeric material thereabout have also been used for such purposes. Tubes having a longitudinally folded metallic inner layer can be found, for example, in U.S. Pat. Nos. 3,233,036 or 3,806,358 and are also presently made and sold by the assignee of the present invention under the trade name "Dekabon". Tubes having an inner layer formed by the folding of metallic tapes have the disadvantage of having an inner exposed seam which can lessen their thermal resistance and mechanical handling capabilities and which may also provide a point of attack in applications requiring the conveyance of corrosive fluids. The mechanical handling capabilities of tubes having an inner layer formed by the longitudinal folding of a metallic tape are necessarily limited, particularly in smaller tube sizes, due to the fact that metal tapes are generally required to be relatively thin in order to fold them longitudinally into a tubular shape at attractive production rates. Generally, tubular shapes formed by the longitudinal folding of metallic tapes are made in such a manner as to provide an overlap between their oppositely facing longitudinally extending edges for the purpose of mechanically interlocking or otherwise adhesively affixing the folded tape into a closed tubular configuration. As a result of this practice, the radial thickness of the folded metal tape is necessarily larger in the region of the overlap than elsewhere about the circumference of the tube. Nonuniformity in radial thickness of metallic tubular shaped forms can, and often does lead to greater tendency for fluid leakage under pressure in the region of fitting attachment. Tubes made in accordance with the present invention do not possess the aforesaid disadvantages in that they comprise a tubular shaped seamless, as welded, or welded and drawn inner layer of metallic material having a substantially uniform radial wall thickness around its circumference; an outer tubular shaped layer of polymeric material of substantially uniform radial wall thickness around its circumference disposed in encompassing relationship about the inner layer and of a magnitude such that its radial wall thickness is 50% or more of the total radial thickness of the wall of the tube; a polyamide based hot melt adhesive interposed between the inner and outer layers which bonds them together and which preferably contains an amount by weight of piperazine used in the process of making the polyamide to promote its bonding characteristics without adversely affecting its water resistance; and an outer tube diameter sized during the process of making the tube such that the tube can be attached, without further dimensional alteration, to fittings standardly used in the industry. The term "seamless, as welded, or welded and drawn", as herein used, shall not mean metallic tubing which has been formed by the longitudinal folding or spiral wrapping of metallic tapes having abutting or overlapping edges which are mechanically interlocked or adhesively adhered together so as to result in a discontinuous or interrupted wall in the form of a seam and which is further characterized as not having a substantially uniform radial wall thickness around its circumference. The term "seamless, as welded, or welded and drawn", as herein used, means tubing that has been formed by extrusion, drawing, or welding and drawing, and the like, such that the tube wall is integrally sealed and of substantially uniform radial wall thickness around its circumference.

The coating of metallic tubes and pipes with polymeric materials has long been recognized as a method of providing protection from corrosive environments. U.S. Pat. No. 2,447,420 disclosed, for example, the coating of rigid electrical conduit with a polymeric material and U.S. Pat. No. 2,724,660 disclosed an immersion process of applying a protective jacketing to flexible metal tubes while in a shaped configuration. In U.S. Pat. No. 3,815,640, a synthetic resin coated pipe is disclosed that has annular projections at regular intervals for use as a supporting pole in agricultural applications and U.S. Pat. No. 3,502,492 discloses the method of electrostatically coating metal substrates with epoxy resin and polyvinyl chloride powder. Such art, however, does not teach or suggest tubing of the type made in accordance with the present invention in that it is devoted to the coating, with polymeric materials, of standardly recognized metal tube wall thicknesses resulting in oversized tube outer diameter in relationship to what is normally a fixed standardized inner diameter, or vice versa, and generally requires dimensional alteration such as, for example, skiving away of the polymeric material in order to make fluid-tight seals when attached to conventional fittings.

Tubes made in accordance with the present invention provide a means of transferring fluid and/or fluid transmission signals under pressure from one location to another with the corrosion resistance and integrity of seamless, as welded, or welded and drawn metallic inner liner and the protective benefit of an outer polymeric coating bonded thereto while maintaining a standardized outer diameter such that the tube can be attached, without further dimensional alteration, to fittings standardly used to couple equivalently dimensioned tubes having a singular polymeric or metallic wall.

SUMMARY OF THE INVENTION

It is an object of this invention to provide an improved elongate deformable tube for use in the conveyance of fluids and/or fluid transmission signals under pressure. It is a further object of this invention to provide an elongate deformable tube of substantially uniform radial wall thickness around its circumference having a composite wall comprising a seamless, as welded, or welded and drawn metallic inner layer encompassed by a polymeric outer layer which has a radial wall thickness that is 50% or more of the total radial thickness of the composite wall of the tube and which has an outer diameter sized during the process of making the tube such that the tube can be attached to conventional fittings without further dimensional alteration. It is a more specific object of this invention to provide a deformable tube, and the method of making a tube, for use in the conveyance of fluids and/or fluid transmission signals under pressure having a seamless, as welded, or welded and drawn metallic inner layer of substantially uniform radial wall thickness about its circumference; an extruded polymeric outer layer of substantially uniform radial wall thickness around its circumference which is 50% or more of the total radial thickness of the composite wall of the tube and which is disposed about and coextensive with the inner layer; a dimensionally standardized outer diameter that is sized during the process of making the tube such that the tube can be attached to conventional fittings, without further dimensional alteration; and the inner and outer layer are bonded together by means of a polyamide based hot melt adhesive interposed therebetween which preferably contains an amount of piperazine used in the process of making the polyamide which is less than about 15% by weight to the total weight of the polaymide and that is sufficient to promote the bond between the layers without adversely affecting its water resistance.

BRIEF DESCRIPTION OF THE DRAWINGS

Other objects will become apparent from the following description with reference to the accompanying drawing in which.

DESCRIPTION OF THE PREFERRED EMBODIMENTS

Figure 1:
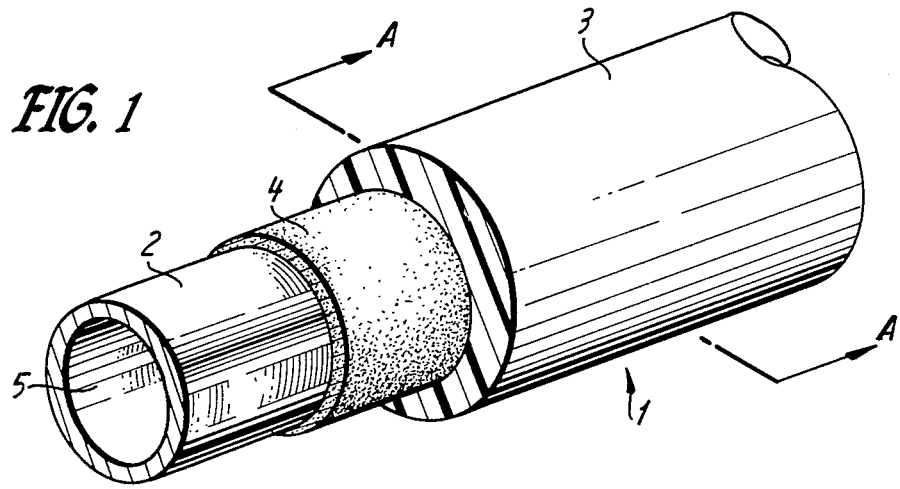
FIG. 1 is a partially cut-away perspective view of an embodiment of the invention wherein the outer polymeric layer has been cut back for the purpose of showing the dimensional relationships involved.

Referring now to FIG. 1 in which tube 1 of the invention has bore 5 therethrough enclosed by an annular composite wall comprising a seamless, as welded, or welded and drawn tubular shaped inner layer 2 coextensively about which is disposed outer polymeric layer 3. Outer layer 3 is cut back in FIG. 1 to show more clearly the dimensional relationship between inner layer 2 and outer layer 3. The annular walls of inner layer 2 and outer layer 3 are substantially uniform in radial thickness around their circumferences and the radial thickness of outer layer 3 is 50% or more of the total radial thickness of the annular composite wall of tube 1. Outer diameter "y" of outer layer 3 of tube 1 is sized to conform to tubing outer diameters standardly established as whole fractional values increasing by equal increments of 1/16 inch such as, for example, ¼"; 5/16"; ⅜" and so on up through 1 inch outside diameter and increasing by ⅛" increments from 1 inch to about 2 inches outside diameter (and including any present decimal or metric equivalents thereof). For the purposes of this invention, deformable tubing is tubing that is generally included within the outer diameter size range of 1/16 inch through 2 inch outer diameter and is distinguished from rigid tubing or pipe in that it can be deformed by bending or shaping with relative ease. Experience has shown that the more popular sizes of such tubing are wherein the outer diameter "y" is ¼"; ⅜" or ½". Inner diameter "x" shown in FIG. 1 has been standardized to a lesser extent for polymeric tubing in contrast to metallic tubing and is generally dependent upon the strength characteristics desired of the tube and whether the tube is singularly made from either a metallic or polymeric material. Generally, inner diameter "x" may be a whole fractional number or it may be a decimal or metric value equivalent thereto. For illustrative purposes, a standard metal tube may have an outer diameter "y" of about ¼" and an inner diameter "x" of about 0.190" whereas a polymeric tube used for similar purposes may have an outer diameter "y" of about ¼" and an inner diameter "x" of about 0.170". Generally, as illustrated by the comparative example, polymeric tubing is designed with a heavier wall and consequently a smaller inner diameter "x" in order to provide increased strength for use in applications normally handled by metal tubing. As a consequence of this practice and because of differences in resilience between metallic and polymeric materials, conventional fittings have evolved that are peculiar to each other. Likewise, certain fittings are available that will suitably attach to a standardly sized tube whether it be made from a metallic or a polymeric material. It is to be understood that dimensions referred to herein lie nominally within the range of tolerance established by the manufacturer thereof or as otherwise established in the trade. The radial thickness of polymeric outer layer 3 is shown as "$t_p$" In FIG. 1 and the radial thickness "$t_m$" of inner layer 2 shown in FIG. 1 is to remain less than 50% of the total radial thickness of the annular composite wall of tube 1. The ability to tailor the radial wall thickness "$t_m$" of inner metallic layer 2 while maintaining a standardized outer diameter, as hereinbefore described, provides a means of minimizing the cost and use of valuable metals and yet provides the end user with handling and strength characteristics tailored for his needs. Shown in FIG. 1 is layer 4 interposed between layer 2 and layer 3. Layer 4 is made from a polyamide based hot melt adhesive that is preferably extruded about layer 2 and has a radial wall thickness designated as "$t_a$". The total radial thickness of the annular composite wall of tube 1 is the sum of the hereinbefore described radial wall thickness "$t_m$", "$t_a$" and "$t_p$". Although the radial wall thickness of layer 4 may be of any reasonable magnitude suitable for the purposes of bonding layer 3 to layer 2, it is generally preferred that it be within ½ mil to 10 mils in radial wall thickness and even more preferred that it be within the range of 1 mil to 5 mils. Thus, for example, tubes made in accordance with the invention and found to be particularly useful may be typically dimensioned as shown in the following Table I.

TABLE I

| | | Tube Dimensions (Inches) | | | |
|---|---|---|---|---|---|
| x | y | $t_m$ | $t_a$ | $t_p$ | Total Composite Radial Wall Thickness ($t_m + t_a + t_p$) |
| .170 | .250 | .015 | .002 | .023 | .040 |
| .251 | .375 | .020 | .002 | .040 | .062 |
| .376 | .500 | .028 | .002 | .032 | .062 |

Figure 2:
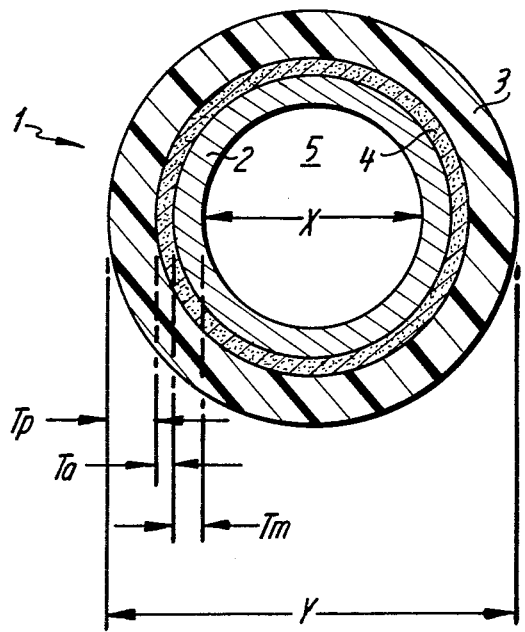
FIG. 2 is a cross-sectional view A—A of the embodiment of FIG. 1.

FIG. 2 shows cross section A—A of FIG. 1 wherein tube 1 of the invention has bore 5 enclosed by an annular composite wall comprising an inner seamless, as welded, or welded and drawn metallic layer 2 enclosed by outer polymeric layer 3 and bonded thereto by means of a polyamide based hot melt adhesive layer 4 interposed therebetween. As in FIG. 1, the annular walls of inner layer 2 and outer layer 3 are substantially uniform in radial thickness around their circumferences. Also shown in FIG. 2, is standardized outer diameter "y" of outer layer 3 of tube 1; inner diameter "x" of inner layer 3 of tube 1; radial wall thickness "$t_p$" of outer layer 3; radial wall thickness "$t_a$" of layer 4; and radial wall thickness "$t_m$" of inner layer 2 which has been sized so as to minimize the amount of metal used in tube 1 while providing suitable handling and strength characteristics required for its intended application.

Although inner layer 2 of FIG. 1 (as for all embodiments of the invention) may be made from any suitable metallic material, it is preferred that inner layer 2 be made from an alloy of either copper or aluminum. Inner tubular metallic layer 2 may be made, for example, by any suitable process which provides a seamless, as welded, or welded and drawn metallic tube having a relatively smooth bore therethrough and having a substantially uniform radial wall thickness around its circumference.

Outer layer 3 of FIG. 2, as with all embodiments of the invention, may be made from any suitable polymeric material which provides the corrosion resistance, weatherability and other characteristics desired. Although polymeric outer layer 3 may be applied over the outer surface of adhesive layer 4 by processes such as, for example, dipping, spraying, powder fusion, and the like, it is preferred that outer polymeric layer 3 be extruded about the outer surface of adhesive layer 4 in such a manner that outer layer 3 fits snugly about layer 4 with its inner surface directly in contact therewith. Although a variety of thermoplastically processable polymeric materials may be selected for outer layer 3 such as, for example, rubber, nylon, thermoplastic rubber, polyurethane, and the like, it is preferred that outer layer 3 be extruded from either a thermoplastically processable polyvinyl chloride or a high density polyethylene composition since they appear to provide a broad range of characteristics desirable for many end-user applications. It is also to be understood that polymeric materials used to make outer layer 3 of tube 1 of the invention may be cross-linked to improve certain properties during or subsequent to the process of applying them about layer 4. Such cross-linking may be accomplished by either conventional chemical means such as, for example, heat curing of polymeric compositions containing suitable amounts of a cross-linking agent, such as a peroxide, or they may be of the type that can be cross-linked by suitable exposure to irradiation such as, for example, high energy electrons. In cases where outer layer 3 is disposed thermoplastically about layer 4, the cross-linking is necessarily accomplished subsequent to such process.

Bonding layers 2 and 3 together by means of adhesive layer 4 has been found to provide improved handling characteristics; minimize relative slippage between the layers; and to improve the ability to retain fittings under variable and fluctuating internal and/or environmental temperature conditions. Adhesive layer 4 is formed from a hot melt adhesive based upon the polyamide family and is applied during the process of making tube 1 of the invention. Although adhesive layer 4 may be formed about layer 2 by means of passing inner tubular shaped layer 2 through a heated reservoir containing the polyamide based hot melt adhesive in a melted form suitable for uniformly coating the outer surface of layer 2, or alternatively, by a fluid bed process whereby a coating of adhesive layer 4 is deposited upon the outer surface of layer 2 by means of passing a suitably heated form of inner tubular shaped layer 2 through powdery form of the polyamide hot melt adhesive, it is preferred that layer 4 be uniformly deposited about the outer surface of layer 2 by means of an extrusion process. It is to be understood that the outer surface of inner layer 2 may also be altered in such a manner as desirable to enhance its ability to bond to adhesive layer 4 or directly to the inner surface of outer layer 2, as hereinbefore described, such as, for example, by suitably etching and/or priming the outer surface of inner layer 2.

It has been found that hot melt adhesives based upon polyamide derived from the reaction products of di-amines and dibasic acids provide an effective means of bonding inner metallic layer 2 to outer polymeric 3 in making embodiments of tube 1 of the invention. It is believed that when such polyamide hot melt adhesives contain a sufficient amount of piperazine used in the process of making the polyamide that the amount of surface preparation, if any, required to enhance the bondability of the outer surface of layer 2 is diminished in relation to the level of bond achieved provided that the amount of piperazine is low enough so as not to adversely affect the water resistance of the adhesive. In this respect, it has been found that the water resistance of the base polyamide of the hot melt adhesive is adversely affected when the amount, by weight, of piperazine used in making the polyamide is more than about 15% of the total weight of the polyamide. Thus it seems that optimization of the bonding characteristics of polyamide based hot melt adhesives used in conjunction with making embodiments of the invention may be enhanced by use of an amount of piperazine in the process of making the polyamide that is less than about 15%, by weight, of the total weight of the polyamide and tailored to promote the bondability to various metallic and polymeric materials used in making tubes in accordance with the invention yet limited to an amount above which might adversely affect its water resistance.

Following Table II illustrates the results of a comparative study of the bonding characteristics to copper and rigid polyvinyl chloride of two polyamide based hot melt adhesives and the effect of the presence of piperazine in the polyamide portion thereof.

TABLE II

| A. | Preparation Procedure: | |
|---|---|---|
| | Rigid Polyvinyl Chloride: | .030 inch thick slabs prepared by compression molding at 350° F. under 3500 to 4000 p.s.i. using 5 minute |

TABLE II-continued

| | |
|---|---|
| | preheat time and 3 minutes under pressure. |
| Copper: | Copper sheet degreased with acetone and sandblasted copper sheet degreased before and after the sandblasting process. |
| Bonding: | Uniform amounts of the two hot melt adhesives were placed upon degreased copper and degreased sandblasted copper sheet and heated sufficiently to form a uniform melt coating upon which the polyvinyl chloride sheet and melt coated copper sheet were uniformly pressed against each other in a heated press and subsequently cooled to provide the specimens for testing. |

B. Testing Procedure:

The bonded specimens were placed in a tensile testing machine after conditioning and the polyvinyl chloride sheet was pulled from the forms of copper sheet at a separation angle of approximately 180° and at a separation rate of 12 inches per minute.

Specimens were:
1. Control as made
2. Heated in air circulation oven at 80° ± 1° C. for seven days and conditioned for 24 hours at ambient temperature prior to testing.
3. Immersed in boiling water for one hour and subsequently conditioned at ambient temperature for 24 hours prior to testing.

Results:

| Adhesive | Metal Substrate | Initial 180° Peel (lb/in) | Bond After Aging 7 days at 80° C. (%) of Original | Retention After 1 hr. Boiling Water Test(%) of Original |
|---|---|---|---|---|
| $A^1$ | Degreased Copper | $12.5^b$ | $206^a$ | $50^a$ |
| | Degreased Sandblasted Copper | $13.8^b$ | $158^a$ | $47^a$ |
| $B^2$ | Degreased Copper | $16.0^c$ | No bond | No bond |
| | Degreased Sandblasted Copper | $32.0^c$ | No bond | No bond |

[a] indicates 100% Transfer from Copper
[b] indicates adhesive failure
[c] indicates cohesive failure
[1] Adhesive "A" is a hot melt polyamide based adhesive wherein less than about 15% by weight of piperazine to the total weight of the polyamide was used in the making of the polyamide.
[2] Adhesive "B" is a hot melt polyamide based adhesive wherein more than about 15% by weight of piperazine was used in the making of the polyamide.

Table II illustrates that although the bond level between the materials indicated can be enhanced by use of a hot melt polyamide based adhesive such as example "B" having its polyamide portion made with a greater amount of piperazine than was used to make the polyamide portion of adhesive "A", the effect of the greater amount of piperazine was to reduce the water resistance of adhesive "B" in comparison to adhesive "A".

Although the hot melt adhesives used in making tubes in accordance with the invention have been referred to herein as having a polyamide base which may or may not have been formed at least in part by the use of piperazine in the reaction process, it is to be understood that the polyamide based hot melt adhesives included in this invention may contain additional additives incorporated by their manufacturers such as, for example, plasticizers, tackifiers, anti-oxidants, heat stabilizers, and the like. It is to be further understood that cross-linkable versions of polyamide based hot melt adhesives are included within the scope hereof when used to make tubes in accordance with this invention. Since the threshold temperature for chemically cross-linkable versions of a particular polyamide based hot melt adhesive is preferably higher than the temperature at which it is melted for deposing about the outer surface of the inner layer, it is preferred that the polyamide based hot melt adhesive be radiation cross-linkable such as, for example, by high energy electrons. Radiation cross-linkable polyamide based hot melt adhesives used to make tubes in accordance with the invention may or may not contain suitably selected radiation sensitizers to enhance their susceptability to cross-linking. Thus, for example, a tube made in accordance with the invention may have both its outer polymeric layer and intermediate polyamide based adhesive layer cross-linked by radiation during the process of making the tube.

In a preferred method of making tubing in accordance with the invention, it has been found that by preheating the inner metallic layer, the bond between the inner metallic layer and outer polymeric layer can be greatly enhanced. More particularly, a method of making a preferred embodiment of the invention is where an elongate seamless, as welded, or welded and drawn metal tube, having an annular wall of substantially uniform radial thickness around its circumference with a bore therethrough, is moved through a heater having suitable heat capacity to bring the tube to a desired temperature and wherein the tube, if irregular in shape, may be straightened before or after the heating step by means of a straightening device such as, for example, a device using oppositely apposed spaced-apart rollers. A heated layer of suitable thickness of the polyamide based hot melt adhesive is then deposited (by extrusion) coextensively about the outer surface of the still heated metallic tube and the adhesively coated tube, while still heated, is then moved through an extrusion device where a heated outer layer of polymeric material is extruded coextensively about the heated adhesively coated metal tube. The outer polymeric layer is extruded in such a manner as to provide an annular wall thereof which is substantially uniform in radial thickness around its circumference and which is of sufficient thickness that, upon cooling to ambient temperature, its outer diameter is sized such that the tube can be attached, without further dimensional alteration, to fittings standardly used to couple equivalently dimensioned tubes having a singular polymeric or metallic wall. The still heated tube (now having a bore therethrough enclosed by a composite wall comprising a heated inner metallic layer, an intermediate heated polyamide based hot melt adhesive layer disposed about the inner layer and enclosed by an outer heated extruded layer of heated polymeric material) is then sufficiently cooled by suitable means (such as a water bath) so that the outer polymeric layer becomes effectively bonded to the inner metallic layer and the tube can be handled and packaged.

Although the invention has been described in detail for the purpose of illustration, it is to be understood that such detail is solely for that purpose and that variations can be made therein by those skilled in the art without departing from the spirit and scope of the invention.

What is claimed:

1. An elongate deformable tube for use in the conveyance of fluids and/or fluid transmission signals under pressure having a bore therethrough enclosed by a composite annular wall comprising a seamless inner layer made from a metallic material and outer layer made from a polymeric material disposed in encompassing relationship about the inner layer and bonded thereto by means of a polyamide based hot melt adhesive interposed therebetween, said inner and outer layers having annular shaped walls of substantially uniform radial thickness around their circumferences with the outer layer comprising 50% or more of the radial thickness of the total composite annular wall of the tube, and said outer layer having its outer diameter sized during the process of making the tube such that the tube can be attached, without further dimensional alteration, to fittings standardly used to couple equivalently dimensioned tubes having a singular polymeric or metallic wall.

2. The tube of claim 1 wherein the polyamide based adhesive is interposed between the inner and outer layers by means of extrusion.

3. The tube of claim 1 wherein the polyamide base of the hot melt adhesive contains an amount by weight of piperazine used in the process of making the polyamide which is less than about 15% by weight to the total weight of the polyamide and that is sufficient to enhance its ability to bond the inner and outer layers together without adversely affecting its resistance to water degradation.

4. The tube of claim 1 wherein the outer polymeric layer is disposed in encompassing relationship about the inner layer by means of extrusion.

5. The tube of claim 1 wherein the polymeric material of the outer layer is a polyethylene composition.

6. The tube of claim 1 wherein the polymeric material is a polyvinyl chloride composition.

7. The tube of claim 1 wherein the metallic material of the inner layer is an alloy of copper.

8. The tube of claim 1 wherein the metallic material of the inner layer is an alloy of aluminum.

9. The tube of claim 1 wherein the polymeric material of the outer layer is a cross-linked polymeric material.

10. The tube of claim 9 wherein the cross-linked polymeric material is a high energy electron cross-linked material.

11. The tube of claim 1 wherein the polyamide based hot melt adhesive is a cross-linked adhesive.

12. The tube of claim 11 wherein the cross-linked polyamide based hot melt adhesive is a high energy electron cross-linked adhesive.

* * * * *